(12) United States Patent
Ishikawa et al.

(10) Patent No.: US 7,156,277 B2
(45) Date of Patent: Jan. 2, 2007

(54) FRICTION STIR WELDING METHOD AND APPARATUS

(75) Inventors: Soichiro Ishikawa, Mihara (JP); Haretaro Hidaka, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/208,555

(22) Filed: Aug. 23, 2005

(65) Prior Publication Data

US 2006/0065698 A1 Mar. 30, 2006

(30) Foreign Application Priority Data

Sep. 27, 2004 (JP) .............................. 2004-278725

(51) Int. Cl.
*B23K 20/12* (2006.01)
*B23K 37/00* (2006.01)
*B23K 31/02* (2006.01)

(52) U.S. Cl. ...................................... 228/2.1; 228/112.1
(58) Field of Classification Search ...................... None
See application file for complete search history.

(56) References Cited

U.S. PATENT DOCUMENTS

| | | | |
|---|---|---|---|
| 5,829,664 A * | 11/1998 | Spinella et al. ........... | 228/112.1 |
| 6,070,784 A * | 6/2000 | Holt et al. ................ | 228/112.1 |
| 6,386,419 B1 * | 5/2002 | Coletta et al. ................ | 228/2.3 |
| 6,648,206 B1 * | 11/2003 | Nelson et al. ........... | 228/112.1 |
| 6,719,184 B1 * | 4/2004 | Ishida et al. .............. | 228/112.1 |
| 6,776,328 B1 * | 8/2004 | Rice et al. ................ | 228/112.1 |
| 6,865,919 B1 * | 3/2005 | Litwinski et al. ............. | 72/256 |
| 6,866,181 B1 * | 3/2005 | Aota et al. ................ | 228/112.1 |
| 2003/0116608 A1 * | 6/2003 | Litwinski .................. | 228/112.1 |
| 2003/0205565 A1 * | 11/2003 | Nelson et al. .............. | 219/148 |
| 2004/0046003 A1 * | 3/2004 | Vyas ........................ | 228/112.1 |
| 2005/0224562 A1 * | 10/2005 | Prevey .................... | 228/233.1 |

FOREIGN PATENT DOCUMENTS

| | | | | |
|---|---|---|---|---|
| JP | 10225781 | A | * | 8/1998 |
| JP | 11320127 | A | * | 11/1999 |
| JP | 3081808 | | | 6/2000 |
| JP | 2003-94175 | | | 4/2003 |
| JP | 2003094175 | A | * | 4/2003 |
| JP | 2004154790 | A | * | 6/2004 |
| WO | WO 9939861 | A1 | * | 8/1999 |
| WO | 2004/014593 | | | 2/2004 |

* cited by examiner

*Primary Examiner*—Lynne R. Edmondson
(74) *Attorney, Agent, or Firm*—Wenderoth, Lind & Ponack, L.L.P.

(57) ABSTRACT

A friction stir welding (FSW) method and apparatus are provided by which power needed for FSW is reduced and a compact FSW tool can be used. In the FSW method, metal members are lapped one on another and a rotating probe of an FSW tool is inserted into a contact portion of the metal members. The contact portion is softened by frictional heat and stirred by the probe so that the metal members are welded together. A portion of the metal members surrounding the probe is heated by a heater.

11 Claims, 11 Drawing Sheets

FRICTION STIR WELDING METHOD AND APPARATUS

BACKGROUND OF THE INVENTION

1. Field of the Invention

The present invention relates to a friction stir welding method and an apparatus by which a conductive material, such as aluminum (including aluminum alloy) or the like, and other magnetic materials are welded by friction stir welding (hereinafter friction stir welding is referred to as "FSW").

2. Description of Related Art

In every case of a conventional FSW method, frictional heat is made use of by a FSW tool comprising a probe and a shoulder portion. The probe is inserted into a weld portion to be welded by FSW and the shoulder portion is urged against members to be welded, such as metal members, (hereinafter referred to as "weld object members"), while the FSW tool is rotated. For this reason, the FSW tool is needed to have a strong rigidity so as to withstand the urging force. Also, a large amount of power is needed so that the FSW tool is forcibly rotated so as to maintain the friction.

Moreover, with respect to the weld object members, a reinforcing means is needed in order for the weld object members to be supported against the urging force of the FSW tool.

Also, in order to obtain a desired frictional heat, a diameter of the probe is sometimes needed to be made larger than a size needed for stirring the weld object members. If weld object members, such as hollow members, have a bone member therein for reinforcement under the weld portion, there is a restriction that a thickness of the bone member must be made larger than the diameter of the probe. That is, there is a problem that the bone member must be selected corresponding to the diameter of the probe.

Likewise, if an integrated piping plate is to be manufactured by FSW, since the distance between adjacent fluid passage grooves of the integrated piping plate cannot be smaller than the diameter of the probe, the degree of the integration is restricted by the diameter of the probe.

Also, there is a restriction of the welding speed due to the welding speed being decided by the time needed for sufficient frictional heat to be generated by the FSW tool.

Also, there is a conventional FSW method in which an additional heating source other than the frictional heat generated by the FSW tool is provided at and around the weld portion to thereby enhance the welding speed. For example, as shown by perspective views of FIGS. 10, 11 and 12, a rotating probe 53 is inserted into a weld portion 54 between weld object members 50, 51, both made of aluminum, and a contact portion of the weld object members 50, 51 making contact with the probe 53 is softened by the frictional heat and stirred by the probe 53. In this state, a FSW tool 52 together with the probe 53 is moved along the weld portion 54 so that the weld object members 50, 51 are welded together, wherein a front portion of the weld portion 54 in a moving direction X of the probe 53 is heated by an outside heating source (laser beam 55 in FIG. 10, gas flame 56 in FIG. 11 and a heating roller 57 in FIG. 12) so that the temperature there becomes 100 to 300° C. This is proposed in Patent Document 1 mentioned below.

Also, as shown by a perspective view of FIG. 13, a heating device comprises an FSW tool having a probe 53 that moves on a weld portion 54 of weld object members 50, 51. Induction heating sources 58, 59 are arranged at front and rear positions of the probe 53 so as to move together with the probe 53. A power source 60 is used for supplying the induction heating sources 58, 59 with electric power and a temperature setting means 61 is used for setting a temperature of the weld portion 54. A gap is provided between the induction heating sources 58, 59 and the weld object members 50, 51. At the time of welding, the induction heating sources 58, 59 are heated by the power source 60 to a set temperature set by the temperature setting means 61, so that front and rear portions of the weld portion 54 in the moving direction X of the probe 53 are heated by the induction heating sources 58, 59. This is proposed in Patent Document 2 mentioned next.

(Patent Document 1) Japanese published patent 3081808 (FIGS. 1, 2 and 3)

(Patent Document 2) Japanese laid-open patent application 2003-94175 (FIG. 1)

Nevertheless, the methods of the above-mentioned Patent Documents 1 and 2 are only provided to show that the pre-heating is done for shortening the treatment time of the FSW method and that post heating is done for enhancing the quality after the treatment. The methods of Documents 1 and 2 have several disadvantages. Specifically, the places to be heated are distant from the place where the FSW is being carried out, thus making it difficult to effectively control the degree of heating and softening of the place where the FSW is being carried out. Also, a large amount of power (electric power) is needed for driving the FSW tool, and a larger FSW tool than is necessary must be used.

SUMMARY OF THE INVENTION

It is an object of the present invention to solve the problems of the prior art by providing a FSW method and apparatus in which the power needed for performing the FSW can be reduced and a FSW tool having a compact size can be used.

In order to achieve the above-mentioned object, the present invention employs the following aspects (1) to (13) in a FSW method and apparatus:

(1) In the first aspect of the present invention, a friction stir welding (FSW) method comprises the steps of lapping metal members one on another and inserting a rotating probe of a FSW tool into a contact portion of the metal members. The contact portion thus makes contact with the probe, thereby causing the contact portion to be softened by frictional heat and stirred by the probe, such that the metal members are welded together. A portion of the metal members surrounding the probe is also heated by a heating means.

(2) In a second aspect of the present invention, the probe and the rotator of the FSW tool are made of a non-conductive material, and the heating means effects an electromagnetic induction heating.

(3) In a third aspect of the present invention, the heating means is provided concentrically with the FSW tool and an electromagnetic wave shielding means is arranged above the heating means.

(4) In a fourth aspect of the present invention, a temperature measuring means measuring a heating temperature of the metal members is provided in the vicinity of the FSW tool, and an output of the heating means is controlled based on a measured value of the heating temperature.

(5) In a fifth aspect of the present invention, a rotational state of the probe is measured, and an output of the heating means is controlled based on the rotational state.

(6) In a sixth aspect of the present invention, a distance between the heating means and a surface of the metal members is adjustable.

(7) In a seventh aspect of the present invention, the heating means is provided concentrically with the FSW tool, and the heating means is pressed against the metal members by a pressing means.

(8) In an eighth aspect of the present invention, the heating means is provided at a front position of the probe in a moving direction of the probe and an inspection of a portion welded by the FSW tool is carried out at a rear position of the probe in the moving direction of the probe is carried out.

(9) In a ninth aspect of the present invention, a plurality of pressing means are arranged around the FSW tool.

(10) In a tenth aspect of the present invention, the heating meansis revolved via a revolving stand while it is moved in the moving direction of the probe.

(11) In an eleventh aspect of the present invention, a FSW apparatus effects FSW of metal members lapped one on another. The FSW apparatus comprises an FSW tool having a probe and a rotator, both being made of a non-conductive material. An electromagnetic induction heating means is provided in the vicinity of, and concentrically with, the FSW tool, and an electromagnetic wave shielding means is provided above the electromagnetic induction heating means.

(12) In a twelfth aspect of the present invention, the FSW apparatus also includes a temperature measuring means provided in the vicinity of the FSW tool, and a temperature setting means for setting a predetermined temperature. A comparing means is provided for computing the difference between the temperature measured by the temperature measuring means and the temperature set by the temperature setting means. A power supply means is provided for controlling a supply current or a supply power to be supplied the electromagnetic induction heating means based on the result computed by the comparing means.

(13) In a thirteenth aspect of the present invention, the FSW apparatus further includes a probe rotational state measuring means for measuring a rotational state of the probe, and a power supply means for enlarging a supply current or a supply power to be supplied to the electromagnetic induction heating means corresponding to the size of a value measured by the probe rotational state measuring means.

The effects of the above-mentioned aspects of the present invention are described as follows:

(1) In the first aspect of the present invention, the portion of the metal members surrounding the probe is heated by a heating means, which enables the contact portion of the metal members to be more efficiently softened by the frictional heat of the rotating probe of the FSW tool, which allows the contact portion to be more efficiently stirred by the probe.

(2) In the second aspect of the present invention, the weld portion to be welded by FSW is heated by electromagnetic induction heating. By the probe and rotator of the FSW tool being made of a non-conductive material, the probe and rotator that rotate at a high speed are not heated by the electromagnetic induction, and strength deterioration caused in, or a thermal influence acting on, an upper drive portion of the FSW tool or other supporting portions can be avoided.

(3) In the third aspect of the present invention, by providing the heating means concentrically with the FSW tool, the weld portion frictionally stirred by the probe can be concentrically heated. Also, even in the case where the welding direction (moving direction of the probe) is curved or in a U-shape, the heating at the weld portion becomes uniform and efficient welding can be carried out.

Further, due to the presence of the electromagnetic wave shielding means, the surrounding metal parts and components are protected from any negative influences, such as heat generation or strain by heat.

(4) In the fourth aspect of the present invention, the heating temperature is measured by the temperature measuring means. By controlling the output of the heating means based on the measured value of the heating temperature, efficient FSW can be carried out.

(5) In the fifth aspect of the present invention, the rotational state of the probe is measured, and by controlling the output of the heating means so as to be increased when the revolution of the probe is decreased or when the current rotating the probe is increased, efficient FSW can be carried out.

(6) In the sixth aspect of the present invention, the heat generation can be adjusted by making the distance between the heating means and the surface of the metal members adjustable.

(7) In the seventh aspect of the present invention, the heating means provided concentrically with the FSW tool is pressed against the metal members by the pressing means and the heat generation due to the frictional heat of the probe can be reduced, thus also reducing the force acting on the FSW tool. As a result, the life of the FSW tool can be elongated and the apparatus can be made smaller.

(8) In the eighth aspect of the present invention, the heating means is provided at the front position of the probe in the moving direction of the probe, and the portion welded by FSW is inspected at the rear position of the probe in the moving direction of the probe. Thus, no excessively large load is needed to act on the probe and shoulder portion so that the size of the FSW tool can be reduced. Also, the work speed can be enhanced so as to contribute to reducing the time needed to perform the welding.

Further, by carrying out the inspection at the same time as the welding work, a work failure can be instantly corrected so that the amount of defects can be reduced and the yield of the products can be remarkably enhanced.

(9) In the ninth aspect of the present invention, the plurality of pressing means are arranged around the FSW tool. This arrangement causes the upper and lower plates to make close contact with each other by an appropriate pressing force. As a result, separation of the upper and lower plates due to vibrations caused by the stirring process can be avoided, and the welding work done by FSW can be ensured.

(10) In the tenth aspect of the present invention, the heating means, while moving in the moving direction of the probe, is revolved via the revolving stand. As a result, even if the welding direction (moving direction of the probe) is curved or in a U-shape, heating of the weld portion becomes uniform and an efficient welding can be carried out.

(11) In the eleventh aspect of the present invention, the probe and rotator of the FSW tool are made of a non-conductive material, and as a result the probe and rotator rotating at a high speed are not heated by the electromagnetic induction. Thus, a strength deterioration of, or a thermal influence acting on, the upper drive portion of the FSW tool or other supporting portions is avoided. Also, by providing the electromagnetic heating means concentrically with the FSW tool, the portion that is welded with FSW by the probe can be concentrically heated. Further, even if the welding direction (moving direction of the probe) is curved or in a U-shape, heating of the weld portion becomes uniform and an efficient welding can be carried out. Also, due to the presence of the electromagnetic wave shielding means, the surrounding metal parts and components are protected from harmful influences, such as heat generation and strain by heat.

(12) In the twelfth aspect of the present invention, the heating temperature is measured by the temperature measuring means, and the output of the electromagnetic induction heating means is controlled based on the measured value of the heating temperature. As a result, efficient FSW can be carried out:

(13) In the thirteenth aspect of the claimed invention, the rotational state of the probe is measured, and by controlling the output of the heating means so as to be increased when the revolution of the probe is decreased or when the current rotating the probe is increased, efficient FSW can be carried out.

DESCRIPTION OF THE PREFERRED EMBODIMENTS

Figure 1:
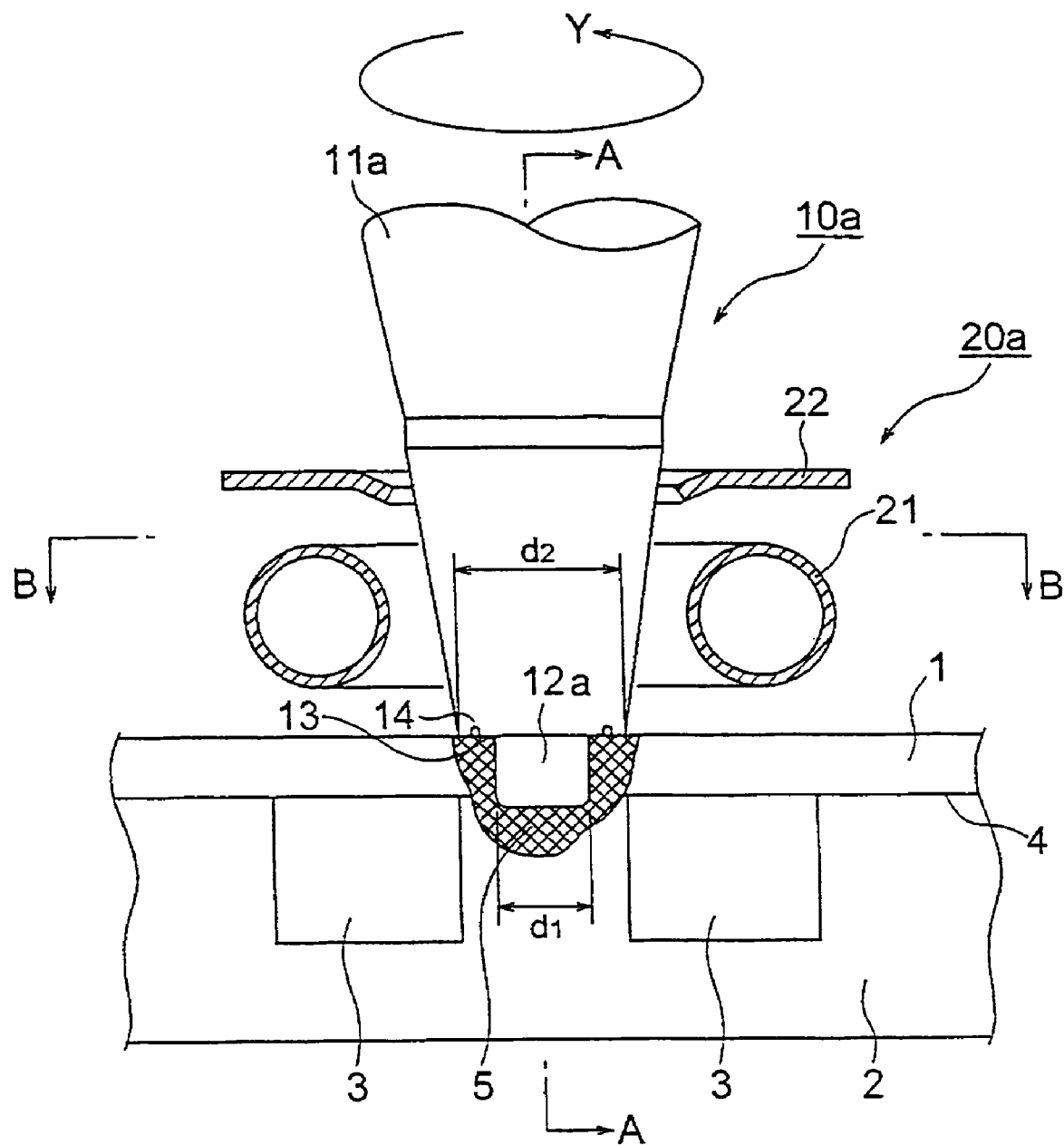
FIG. 1 is a cross sectional front view showing a state in which a FSW tool of a first embodiment according to the present invention performs a welding work.

Herebelow, embodiments according to the present invention will be described with reference to the appended drawings.

First, an example of a structure of an integrated piping plate that is appropriate to be welded by FSW will be described with reference to FIG. 9.

As shown there, the integrated piping is constructed by an upper plate 1 and a lower plate 2, and a plurality of connectors 9 or the like of a device, such as a fuel cell power generating system or the like, are arranged on a surface of the upper plate 1.

Each of the connectors 9 is fixed to an integrally formed plate-like unit of the upper and lower plates 1, 2, welded together by FSW, via a plurality of stud bolts 7 and nuts 8 or the like.

A plurality of fluid passages connecting between and among the plurality of connectors 9 provided on the upper plate 1 are formed in a weld surface 4 portion of the lower plate 2 that is welded to a lower surface of the upper plate 1. That is, the lower plate 2 has its upper surface portion formed with a plurality of fluid passage grooves 3 (3a, 3b) and each of the fluid passages is formed by the upper plate 1 being lapped on the lower plate 2 and by peripheral portions of each of the fluid passage grooves 3 being welded liquid-tight by FSW.

The fluid passages are provided in a form in which they are windingly bent, or a plurality of them are arrayed, or in other forms. Each of the fluid passages is constructed so as to communicate with one or more of the connectors 9 via respective communication holes 6 provided in the upper plate 1. That is, the fluid passages and the communication holes 6 function as pipings through which a necessary fluid (liquid or gas) flows into, or flows out of, various devices connected to the integrated piping plate.

Next, a FSW tool of the first embodiment and a FSW method thereof according to the present invention will be described with reference to FIGS. 1, 2, 3 and 4.

Figure 2:
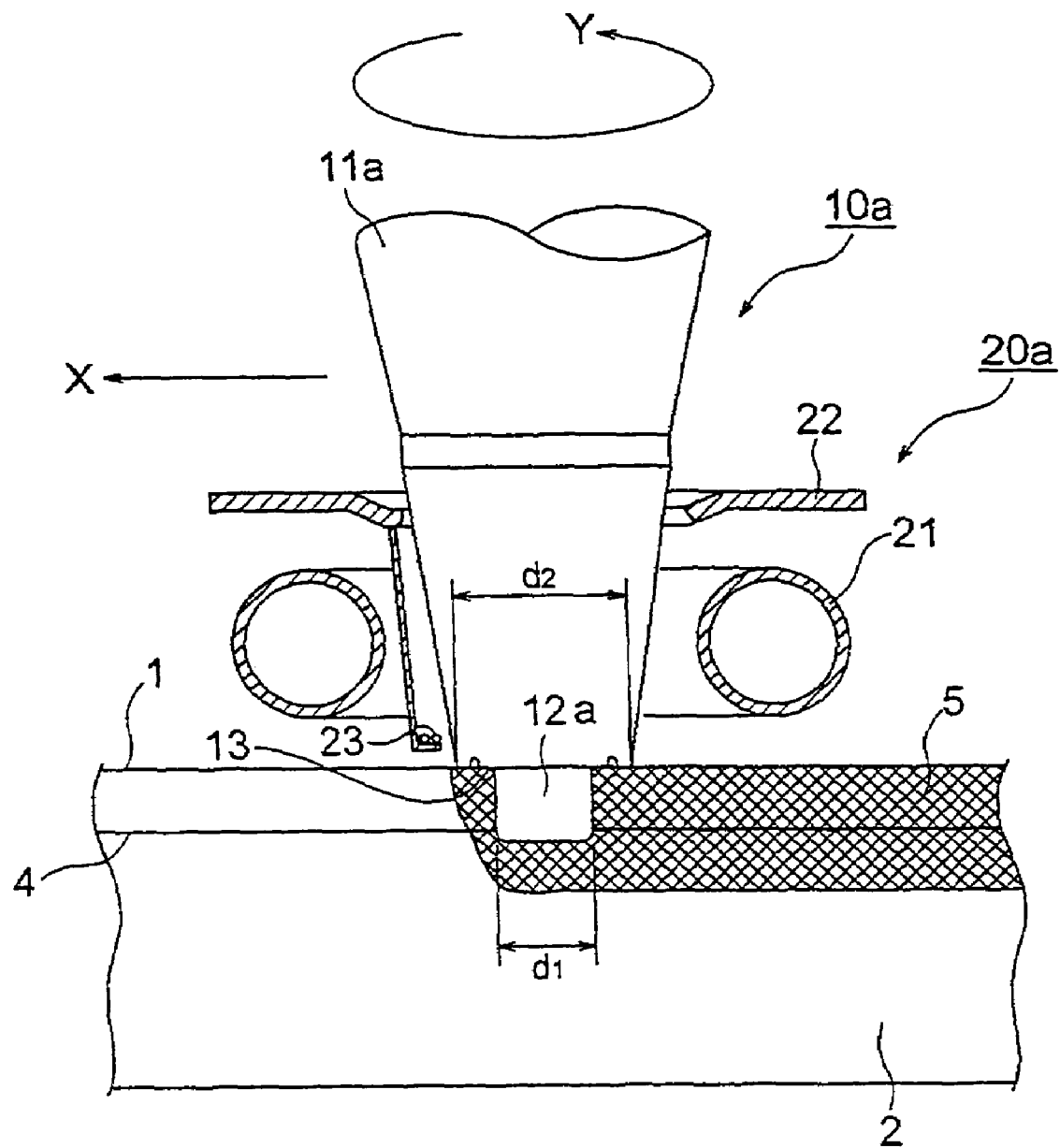
FIG. 2 is a cross sectional view taken on line A—A of FIG. 1.
Figure 3:
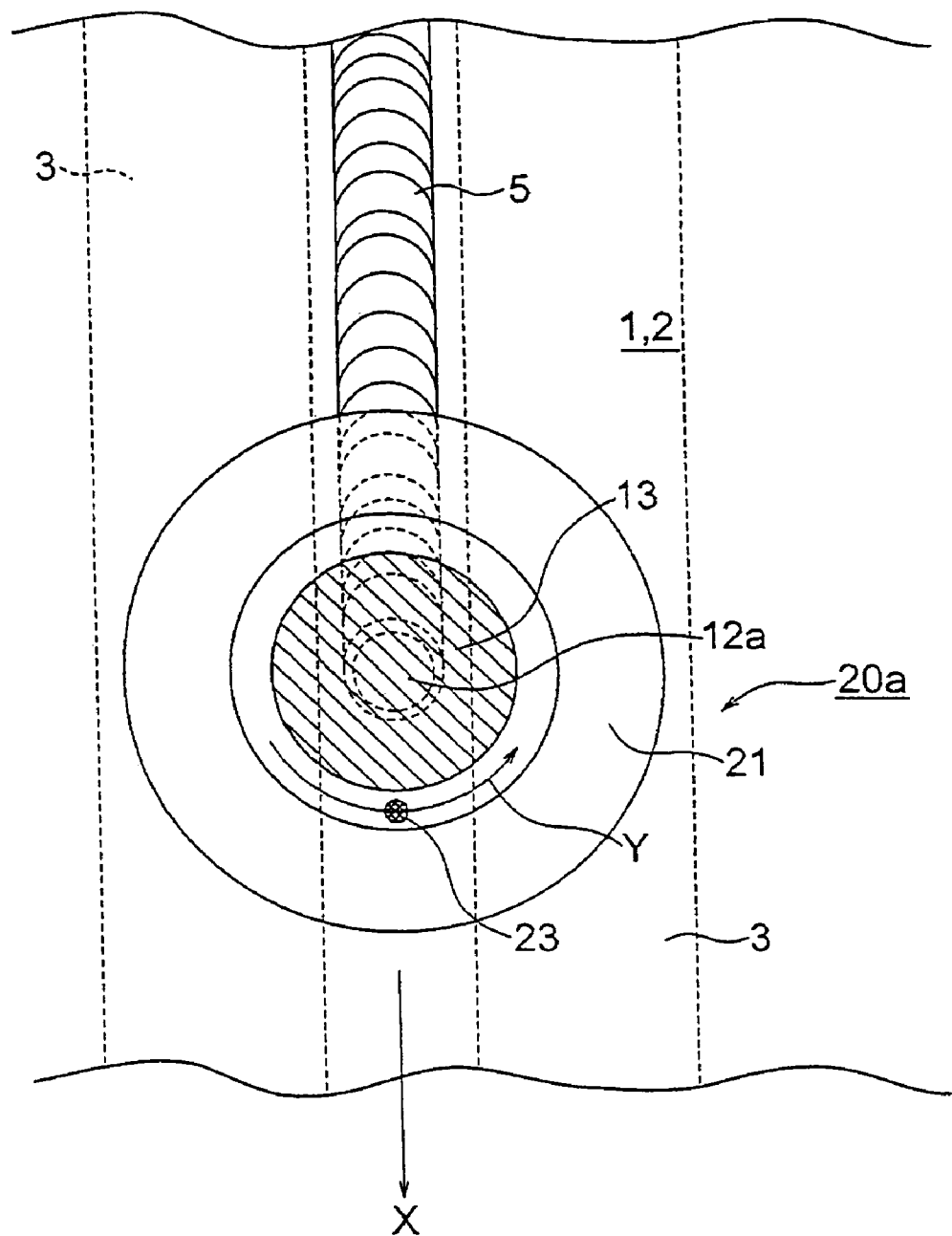
FIG. 3 is a cross sectional view taken on line B—B of FIG. 1.

As shown in FIGS. 1, 2 and 3, a rotator 11a of a FSW tool 10a to be used for FSW is fixed to a rotating shaft of a rotator drive motor 15 (FIG. 4) provided on a moving and supporting stand (not shown) to be rotated at a high speed by the rotator drive motor 15. The rotator 11a is formed having a truncated-conical shape and is provided having its smaller diameter side flat surface arranged downwardly. A flat shoulder portion 13 is formed on this smaller diameter side flat surface. A probe 12a projects from a central portion of the shoulder portion 13 to be rotated together with the rotator 11a. Also, a ring-like groove 14 is formed in a surface portion of the shoulder portion 13.

It is to be noted that a material of the rotator 11a and probe 12a is selected from non-conductive materials (ceramics or other non-metals) as it is preferable that no heat is generated by an electromagnetic induction action. By so constructing the rotator 11a and probe 12a of a non-conductive material, the rotator 11a and probe 12a are not heated by a heating coil 21, to be described later. As a result of the rotator 11a and the probe 12a not being heated strength deterioration of the rotator 11a and probe 12a is avoided, and a thermal influence acting on the rotator drive motor 15, provided above the FSW tool 10a, and the moving and supporting stand can be eliminated.

A heating coil 21 having a doughnut-like shape as a heater 20a for effecting an induction heating is arranged around, and concentrically with, the rotator 11a with an appropriate gap maintained between the heating coil 21 and the rotator 11a. This heating coil 21 is fixed to the moving and supporting stand and is supplied with a high frequency electric power from a heating coil control unit 40 (FIG. 4) via wiring arranged on the moving and supporting stand.

Figure 4:
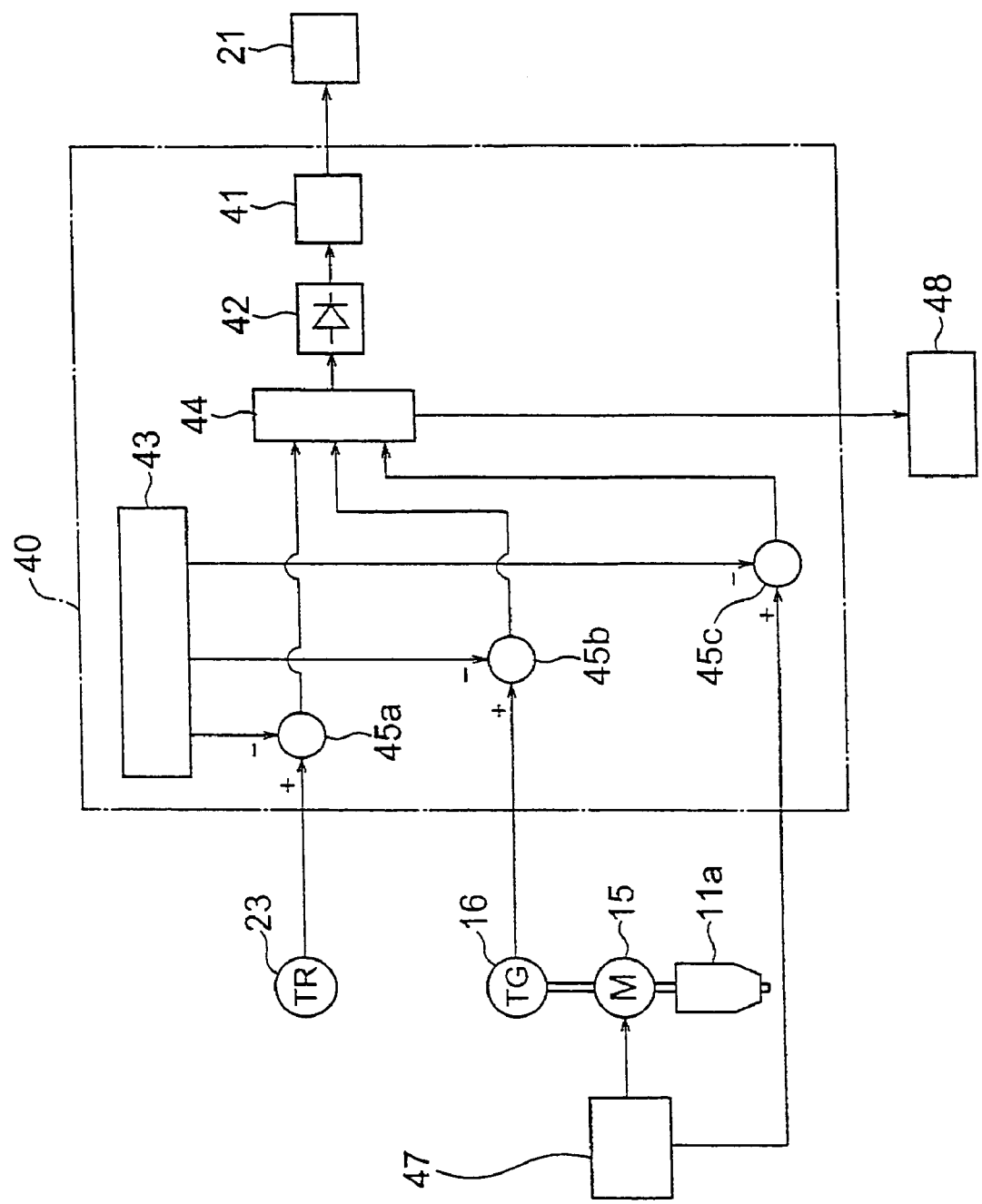
FIG. 4 is a control diagram of the FSW tool of FIG. 1.

As the induction heating device including the heating coil 21 can be employed from those generally obtainable in the market, a detailed description thereof will be omitted, but it is constructed, as shown in FIG. 4, by the heating coil 21, a high frequency electric power generator 42, a matching section output transformer 41, a cooling unit (not shown) cooling the heating coil 21, etc.

The heating coil 21 includes a coil having multiple turns and when the heating coil 21 is supplied with a high frequency current by the heating coil control unit 40, an eddy current is generated in adjacent portions of the upper plate 1 and lower plate 2 by the electromagnetic induction action. As a result, the adjacent portions of the upper plate 1 and lower plate 2 are rapidly heated by heat generated by eddy current loss and hysteresis loss. A center of this heating is a central portion of the heating coil 21, that is, a portion that is being stirred by the probe 12a.

It is to be noted that a lower end of the heating coil 21 is positioned slightly above the level of the shoulder portion 13 of the rotator 11a.

Generally, in the induction heating, the eddy current flows more in the portion near a workpiece surface. Thus, the heat is generated more in the surface portion so that the temperature at the surface of the work piece becomes higher while the temperatures of the inner portions of the workpiece are exponentially lower the further they are from the surface. Hence, in the FSW carried out in the present embodiment, the induction heating is appropriate for heating the weld portion in which the probe 12a is inserted.

Also, as shown in FIG. 2, a temperature sensor 23 (a thermocouple, for example) is arranged in the vicinity of the shoulder portion 13. This temperature sensor 23 also is fitted to the moving and supporting stand.

It is to be noted that the illustration of FIG. 2 shows only one piece of the temperature sensor 23 arranged in front of the shoulder portion 13 in the moving direction X of the rotator 11a. Nevertheless, as the FSW tool 10a moves not only in the moving direction X but also in the reverse direction thereof as well as in the crossing direction thereof, the temperature sensor 23 may be provided with four pieces, for example, arranged with an equal spacing between each of them in the vicinity of the shoulder portion 13.

Moreover, a ring-shaped electromagnetic wave shielding plate 22 is arranged above the heating coil 21 with an appropriate gap maintained between the electromagnetic wave shielding plate 22 and the rotator 11a. The electromagnetic wave shielding plate 22 also is fitted to the moving and supporting stand. It is to be noted that the heating coil 21 and electromagnetic wave shielding plate 22 may be fitted to the moving and supporting stand separately from each other or may be first integrated together to then be fitted to the moving and supporting stand.

It is preferable that a radial directional width of the ring-shaped electromagnetic wave shielding plate 22 is made larger than a radial directional width of the heating coil 21. Also, the electromagnetic wave shielding plate 22 may be shaped so as to cover an upper half portion of the heating coil 21.

By so arranging the electromagnetic wave shielding plate 22 of an appropriate shape around the heating coil 21, the surrounding metal parts and components are protected from harmful influences, such as heat generation or strain by heat.

Next, a control of the heating coil 21 as the heating means 20a will be described with reference to FIG. 4.

The rotator drive motor 15 is supplied with power (or a current) by a FSW tool control unit 47. The FSW tool control unit 47 comprises a power meter (or ammeter) detecting a supply power (or supply current) supplied to the rotator drive motor 15.

It is to be noted that, as shown in FIG. 4, the rotator drive motor 15 driving the rotator 11a may comprise a rotational state measuring device or revolution detector 16 detecting a revolution of the motor 15.

Respective signals from the power meter (or ammeter) of the FSW tool control unit 47 or the revolution detector 16 and the temperature sensor 23 arranged around the shoulder portion 13 are inputted into the heating coil control unit 40.

The heating coil control unit 40 comprises a setting unit 43. Before the FSW work is started, preliminary welding is carried out with respect to the upper plate 1 and lower plate 2 to be applied with the FSW so that appropriate values of the supply power (or supply current) into the heating coil 21 and the frequency thereof, the supply power (or supply current) into the rotator drive motor 15 or the revolution thereof, the moving speed of the FSW tool 10a and the temperature around the shoulder portion 13 can be obtained. These values obtained by the preliminary welding are inputted into the setting unit 43 to be stored therein as respective predetermined set values. Also, the setting unit 43 is so constructed that an operation mode, such as a speed-constant control, a weld portion temperature-constant control or the like, can be set therein.

A signal of the measured temperature from the temperature sensor 23 is inputted into a comparing unit 45a provided in the heating coil control unit 40. As the temperature sensor 23 is usually provided with plural pieces thereof (four pieces, for example), an average value of respective detected values from the plural temperature sensors 23 is computed or a minimum temperature thereof is selected to be inputted into the comparing unit 45a. Also, the comparing unit 45a is inputted with a predetermined temperature set value obtained by the preliminary welding and stored in the setting unit 43.

The comparing unit 45a compares the measured temperature signal with the predetermined temperature set value so that a temperature deviation value is computed to be inputted into a heating coil output computing unit 44.

Also, a signal of the supply power (or supply current) into the rotator drive motor 15 detected by the FSW tool control unit 47 is inputted into a comparing unit 45c provided in the heating coil control unit 40. Also, the comparing unit 45c is inputted with a predetermined supply power (or supply current) set value obtained by the preliminary welding and stored in the setting unit 43.

The comparing unit 45c compares the measured supply power (or supply current) signal from the FSW tool control unit 47 with the predetermined supply power (or supply current) set value so that a supply power (or supply current) deviation value is computed to be inputted into the heating coil output computing unit 44.

Otherwise, a signal of the revolution of the rotator drive motor 15 detected by the revolution detector 16 is inputted into a comparing unit 45b provided in the heating coil control unit 40. Also, the comparing unit 45b is inputted with a predetermined revolution set value obtained by the preliminary welding and stored in the setting unit 43.

The comparing unit 45b compares the measured revolution signal with the predetermined revolution set value so that a revolution deviation value is computed to be inputted into the heating coil output computing unit 44.

The heating coil output computing unit 44 computes a current value to be inputted into the heating coil 21 based on these inputted values of the temperature deviation value and supply power (or supply current) deviation value or revolution deviation value.

For example, if a rotational resistance of the rotator 11a has been increased by a difference of the material, etc. between the upper plate 1 and the lower plate 2, then, due to the increase of the resistance, the supply power (or supply current) into the rotator drive motor 15 is increased or the revolution of the rotator 11a is decreased.

If the operation mode is of a speed-constant control, in order to maintain the moving speed of the FSW tool 10a, it is necessary, for example, to increase the supply current into the heating coil 21 so that the upper plate 1 and lower plate 2 are more heated and softened.

In this case, the heating coil output computing unit 44 computes a current target value to be inputted into the heating coil 21 based on the supply power (or supply current) deviation value from the comparing unit 45c or the revolution deviation value from the comparing unit 45b.

It is to be noted that the temperature deviation value is monitored so as not to exceed a maximum temperature to thereby avoid deterioration of the upper plate 1 and lower plate 2.

The computed current target value is inputted into the high frequency power generator 42. The high frequency power generator 42 controls a firing angle, etc. of a power converter, such as a power transistor, thyristor or the like, based on the current target value. Thereby, the supply power (or supply current) is regulated to be supplied to the heating coil 21 of the heating means 20a via the matching section output transformer 41.

Next, if the operation mode is of a weld portion temperature-constant control, the heating coil output computing unit 44 computes a current target value to be inputted into the heating coil 21 based on the temperature deviation value so that the temperature deviation value from the comparing unit 45a becomes zero.

The computed current target value is inputted into the high frequency power generator 42 so that the supply power (or supply current) is regulated to be supplied to the heating coil 21 via the matching section output transformer 41.

It is to be noted that in a case where the supply power (or supply current) deviation value from the comparing unit 45c or the revolution deviation value from the comparing unit 45b increases, or the supply power (or supply current) increases or the revolution decreases, a moving and supporting stand control unit 48 controlling movement of the moving and supporting stand is inputted with the supply power (or supply current) deviation value or the revolution deviation value to thereby control the moving speed to be reduced so that the supply power (or supply current) deviation value or the revolution deviation value becomes zero.

Figure 9:
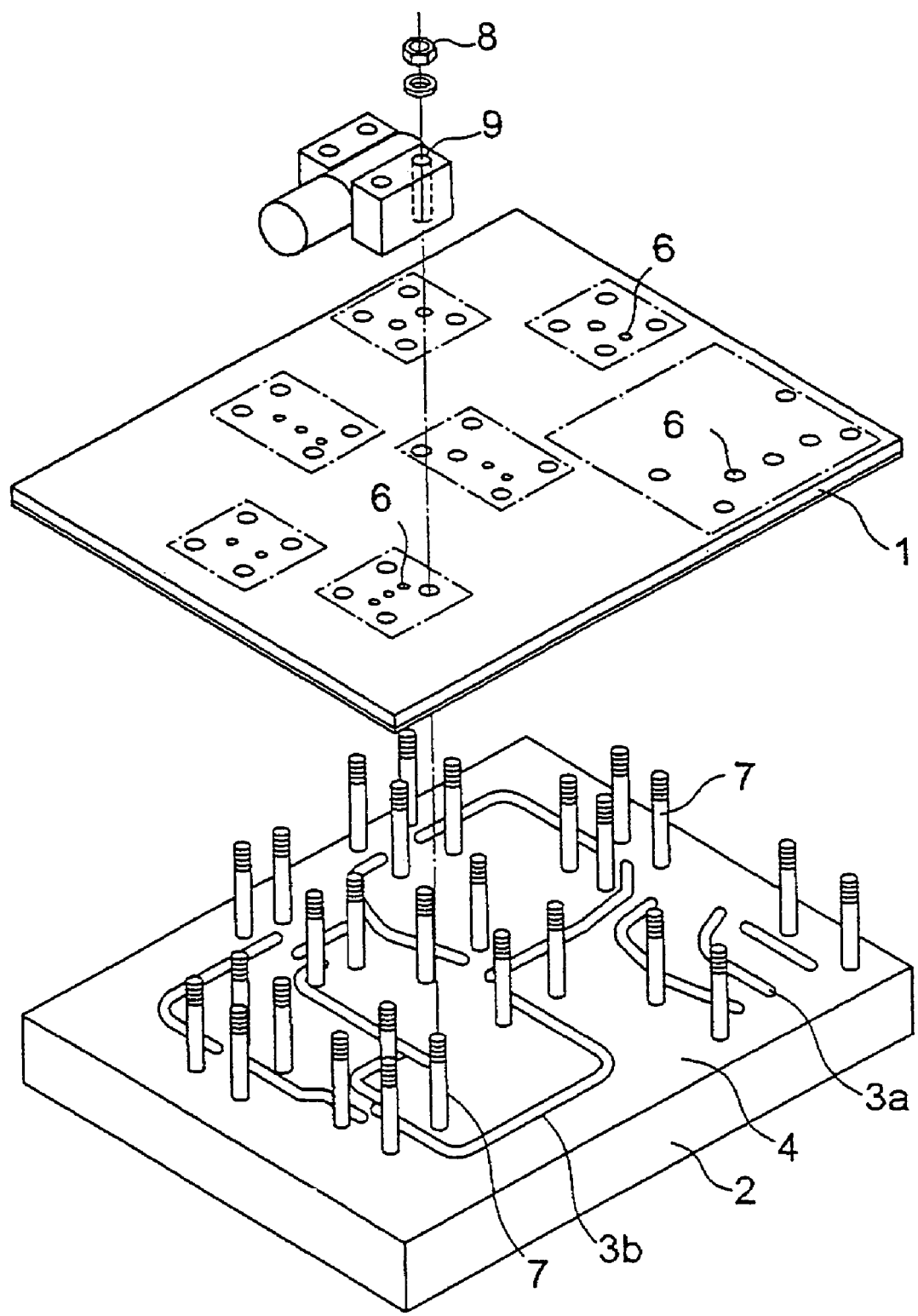
FIG. 9 is a perspective view showing one example of an integrated piping plate that is appropriate to be welded by the FSW tools of the embodiments of the present invention.
Figure 10:
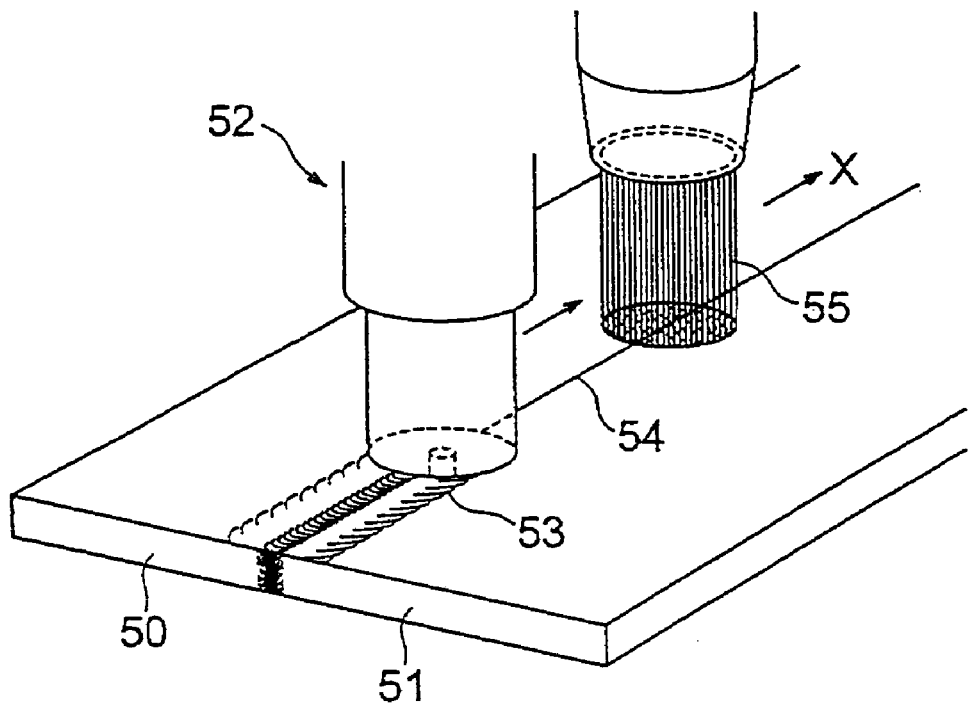
FIG. 10 is a perspective view showing a prior art heating method by means of a laser.
Figure 11:
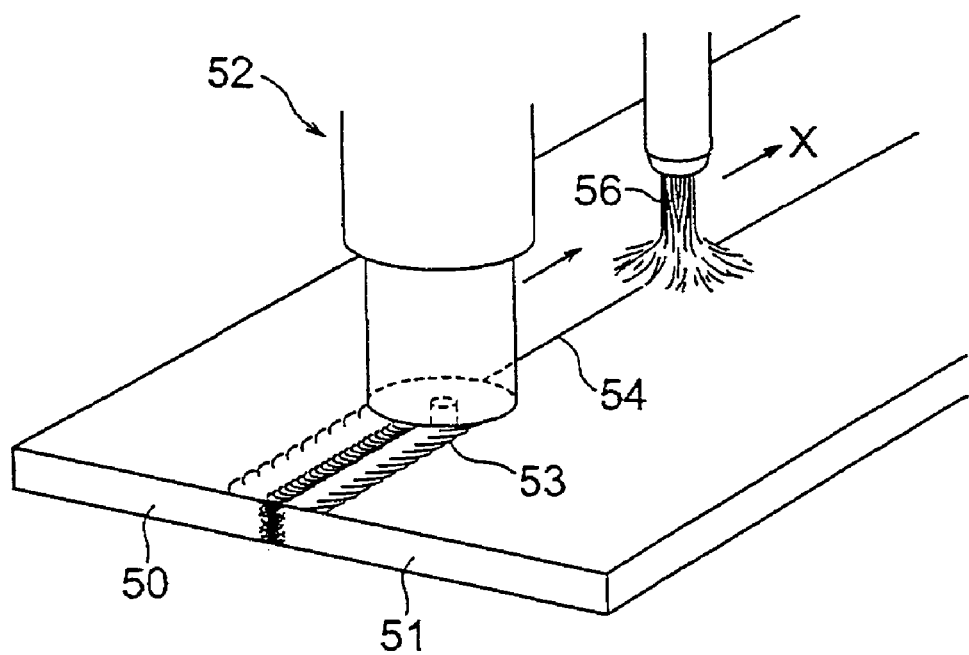
FIG. 11 is a perspective view showing a prior art heating method by means of a gas burner.
Figure 12:
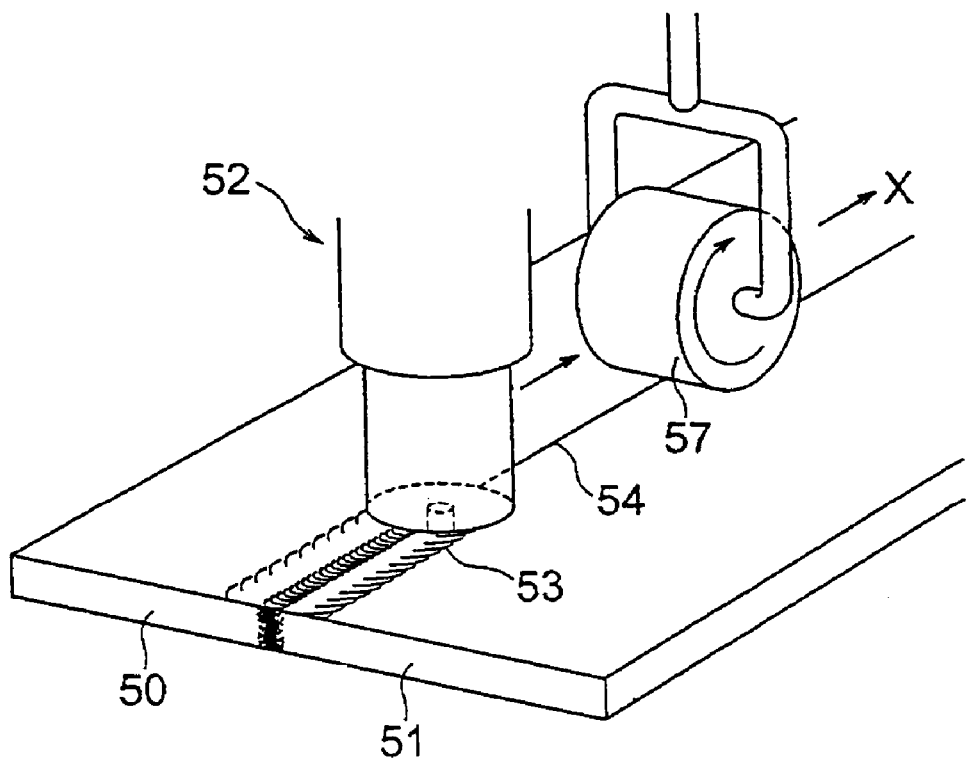
FIG. 12 is a perspective view showing a prior art heating method by means of a heating roller.
Figure 13:
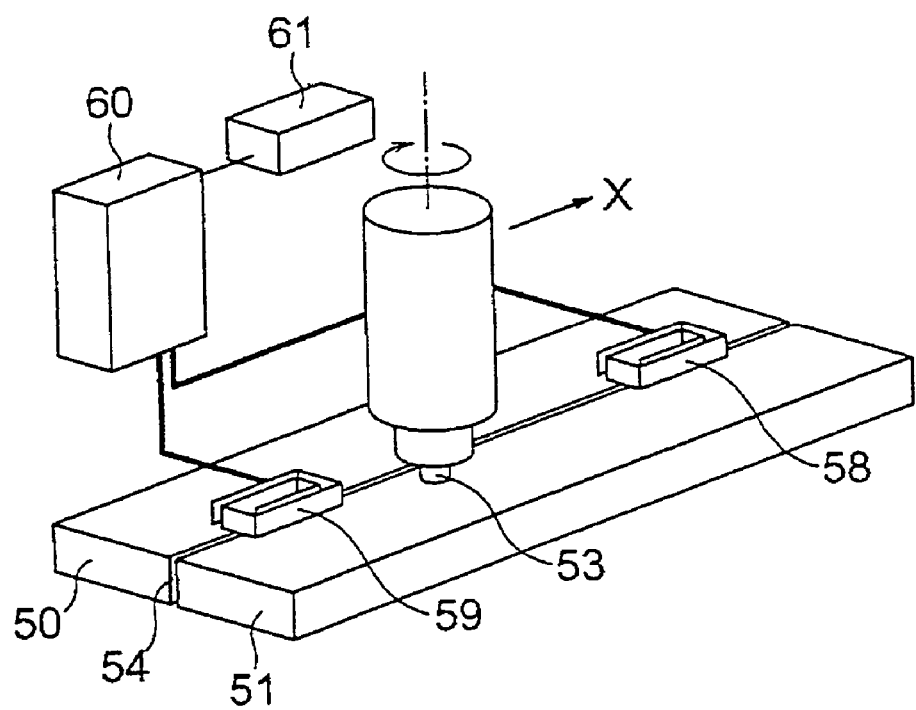
FIG. 13 is a perspective view showing a prior art heating method by means of an induction heating.

Next, by using the apparatus of the first embodiment of the present invention constructed by the FSW tool 10a, heater 20a, electromagnetic wave shielding plate 22, moving and supporting stand and control unit, as mentioned above, a method for working the integrated piping plate comprising the upper and lower plates 1, 2, as shown in FIG. 9, will be described.

It is to be noted that in the present embodiment, as the heating is done by electromagnetic induction heating, the upper and lower plates 1, 2 are made of a conductive material, such as aluminum, copper, carbon steel or the like, or other magnetic materials.

As shown in FIGS. 1, 2 and 3, the upper plate 1 is lapped on the lower plate 2 in which the plurality of fluid passage grooves 3 are formed in advance. The FSW tool 10a comprising the probe 12a, etc. is moved in the moving direction X and thereby the weld portion 5 welded by FSW is formed, wherein the FSW tool 10a is moved along entire outer peripheries of the winding fluid passage grooves 3. Thus, the weld surface 4 is formed between the upper and lower plates 1, 2 so that the upper and lower plates 1, 2 are welded to be fixed together in a liquid-tight state.

According to the above-described FSW method and apparatus, induction heating is applied to the upper plate 1 and lower plate 2 g by the heating coil 21. As a result, the heating is done rapidly and without contacting the upper and lower plates 1, 2. The heating can be applied up to a needed internal depth within the upper and lower plates 1, 2, and a local plastic fluid area can be easily and efficiently formed.

Also, as the non-contact heater 20a is used, no complicated mechanism is needed to follow variations of surface shapes of the workpiece, and the apparatus can be made less expensive and in a simplified manner.

Moreover, if the integrated piping plate is to be worked, as the upper plate 1 and lower plate 2 make no contact with each other in the portion of the fluid passage grooves 3, the heat can be concentrated on the weld portion to be welded where the upper plate 1 and lower plate 2 make contact with each other. Hence, heating of a needed position can be done more efficiently.

Also, as no large pressing force and rotational drive force act on the FSW tool 10a, a diameter d2 of the shoulder portion 13 and a diameter d1 of the probe 12a can be reduced, thereby reducing the entire size of the apparatus. As a result, it becomes possible to manufacture a compact product, such as an integrated piping plate having a high integration degree in which adjacent fluid passage grooves 3 are more approached each other.

Further, as a heat source needed for FSW relies less on the frictional heat caused by the rotational drive of the FSW tool 10a, the welding speed can be elevated to thereby contribute to shortening the work time.

Moreover, as the heater 20a is arranged concentrically with the FSW tool 10a, even if the welding direction (moving direction of the probe) is bent in a hairpin or U shape, as shown in the example of working the integrated piping plate, heating of the weld portion becomes uniform and an efficient welding becomes possible.

While the above description is made such that the supply power (or supply current) into the heating coil 21 is controlled based on the temperature detected by the temperature sensor 23 and the revolution of the rotator drive motor, the supply power into the heating coil 21 may instead be maintained constant.

In this case, the construction may also be made such that a distance between the heating coil 21 (and the electromagnetic wave shielding plate 22) and the workpiece is adjustable. That is, for example, the heating coil 21 (and the electromagnetic wave shielding plate 22) is connected to the moving and supporting stand via a telescopic joint of which the length is controllable so that the distance from the workpiece can be adjusted.

It is to be noted that while the description of the above embodiment and the function and effect thereof is exemplified by the case of working the integrated piping plate, the present invention is by no means limited thereto but may also be applied to welding of other various products.

Next, a FSW tool of a second embodiment of the present invention and a FSW method thereof will be described with reference to FIGS. 5 and 6.

As shown there, a rotator 11b of a FSW tool 10b used for FSW is fixed to a rotating shaft of a rotator drive motor 15 (FIG. 4) provided on a moving and supporting stand (not shown) to be rotated at a high speed by the rotator drive motor 15. A lower portion of the rotator 11b is formed with a cylindrical shape having a lower flat surface portion. A flat shoulder portion 13 is formed on this lower flat surface portion.

A probe 12b projects from a central portion of the shoulder portion 13 to be rotated together with the rotator 11*b*. A material of the rotator 11*b* and probe 12*b* is selected from ceramics, hard metals or the like having a high heat resistance and high strength.

A doughnut-shaped heater 25 constituting a heating means 20*b* for pre-heating the weld portion 5 is arranged around, and concentrically with, the rotator 11*b* with an appropriate gap maintained between the heater 25 and the rotator 11*b*. A heating element 26 generating heat by an electric resistance or the like is provided in the heater 25.

A material of the heater 25 is selected from metals or the like having a high heat resistance and high heat conductivity so that heat generated by the heating element 26 provided in the heater 25 is efficiently transmitted to the upper and lower plates 1, 2.

The heater 25 has an upper surface fixed with a plurality of supporting members 27 fixed thereon and these supporting members 27 are fitted to the moving and supporting stand so as to slidably move up and down relative to the moving and supporting stand.

A compression spring 28 is interposed between the heater 25 and the moving and supporting stand, and the construction is made such that the heater 25 moves together with the FSW tool 10*b*, while the heater 25 makes contact with the upper plate 1 with an appropriate urging force maintained against the upper plate 1 by the compression spring 28.

Next, by using the apparatus of the second embodiment of the present invention constructed by the FSW tool 10*b*, heater 25, etc., as mentioned above, a method for working the integrated piping plate comprising the upper and lower plates 1, 2, as shown in FIG. 9, will be described.

Figure 5:
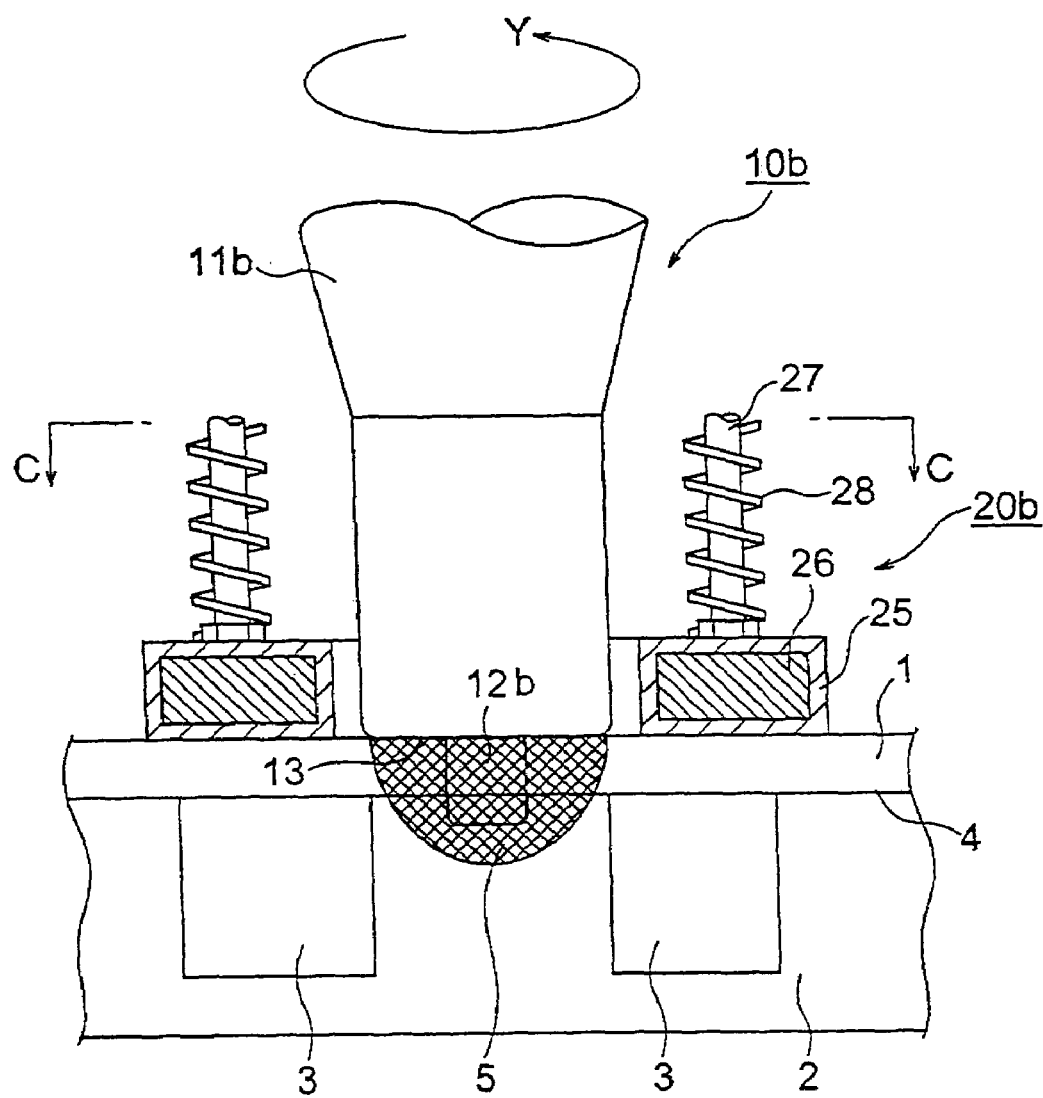
FIG. 5 is a cross sectional front view showing a state in which a FSW tool of a second embodiment according to the present invention performs a welding work.
Figure 6:
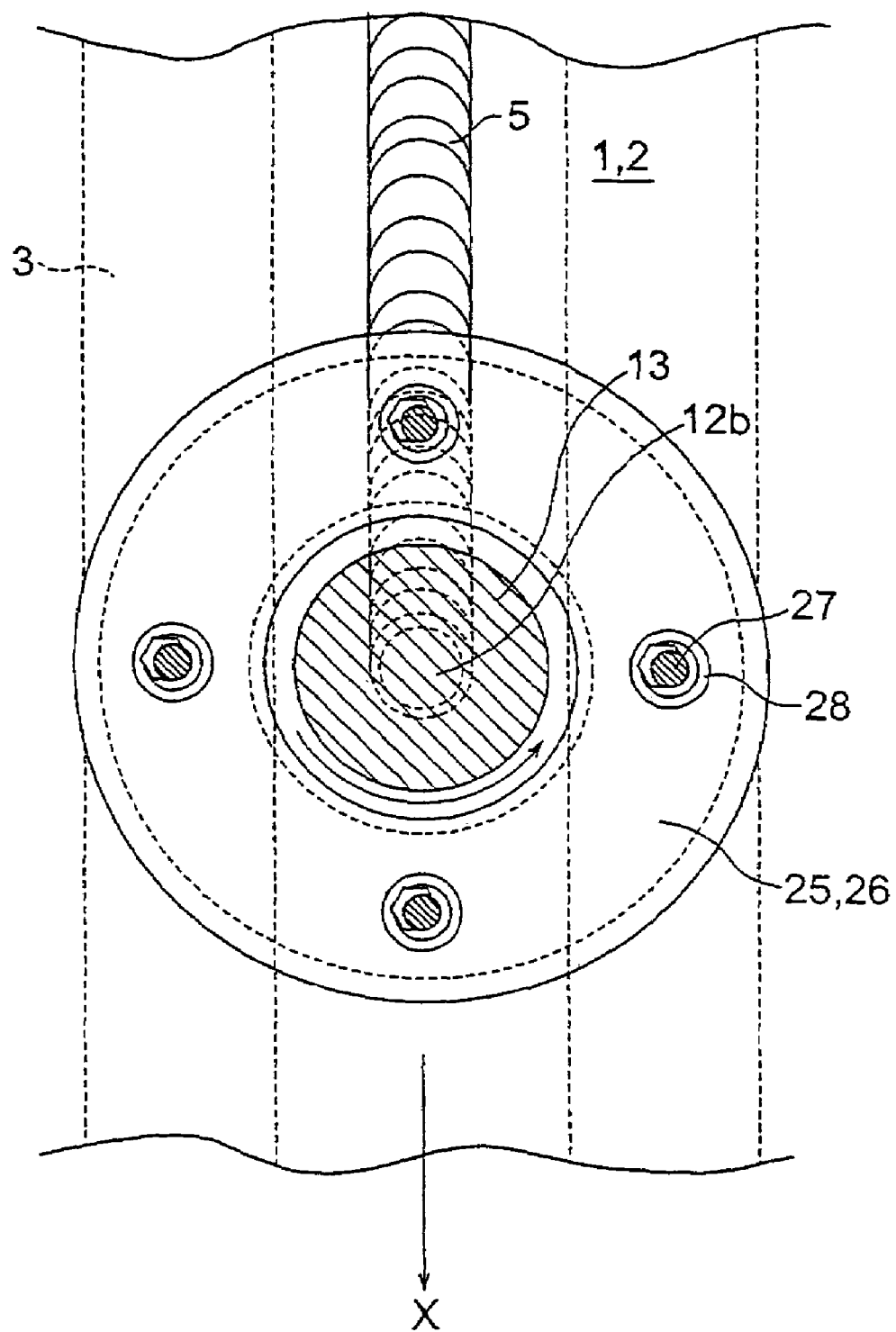
FIG. 6 is a cross sectional view taken on line C—C of FIG. 5.

As shown in FIGS. 5 and 6, the upper plate 1 is lapped on the lower plate 2 in which the plurality of fluid passage grooves 3 are formed in advance so that the FSW is carried out along peripheries of the fluid passage grooves 3, as in the first embodiment. The FSW tool 10*b* that comprises the probe 12*b* integrally constructed with the shoulder portion 13 and projecting from the central portion of the shoulder portion 13 is moved in the moving direction X while the FSW tool 10*b* is driven to rotate in the normal and reverse directions by a drive unit (not shown).

According to the FSW carried out by the FSW tool 10*b* and heating means 20*b* of the pre-heating type of the above-described second embodiment, pre-heating is done by the heating means 20*b*. Thereby, heat generation by the frictional heat of the probe 12*b* can be reduced and a force acting on the FSW tool 10*b* can also be reduced. Hence, the life of the FSW tool 10*b* can be elongated and the apparatus can be made smaller. Also, the width of the fluid passage grooves 3 can be made narrower and the integration degree can be enhanced. Moreover, due to the upper plate 1 and lower plate 2 being heated from outside by the pre-heating, the moving speed of the FSW tool 10*b*, that is, the welding speed, can be increased and the efficiency of the work can be enhanced.

Next, a FSW tool of a third embodiment and a FSW method thereof will be described with reference to FIGS. 7 and 8.

As shown there, the upper plate 1, lower plate 2, fluid passage grooves 3 and FSW tool 10*b* are the same as those of the second embodiment and description thereof will be omitted.

Figure 7:
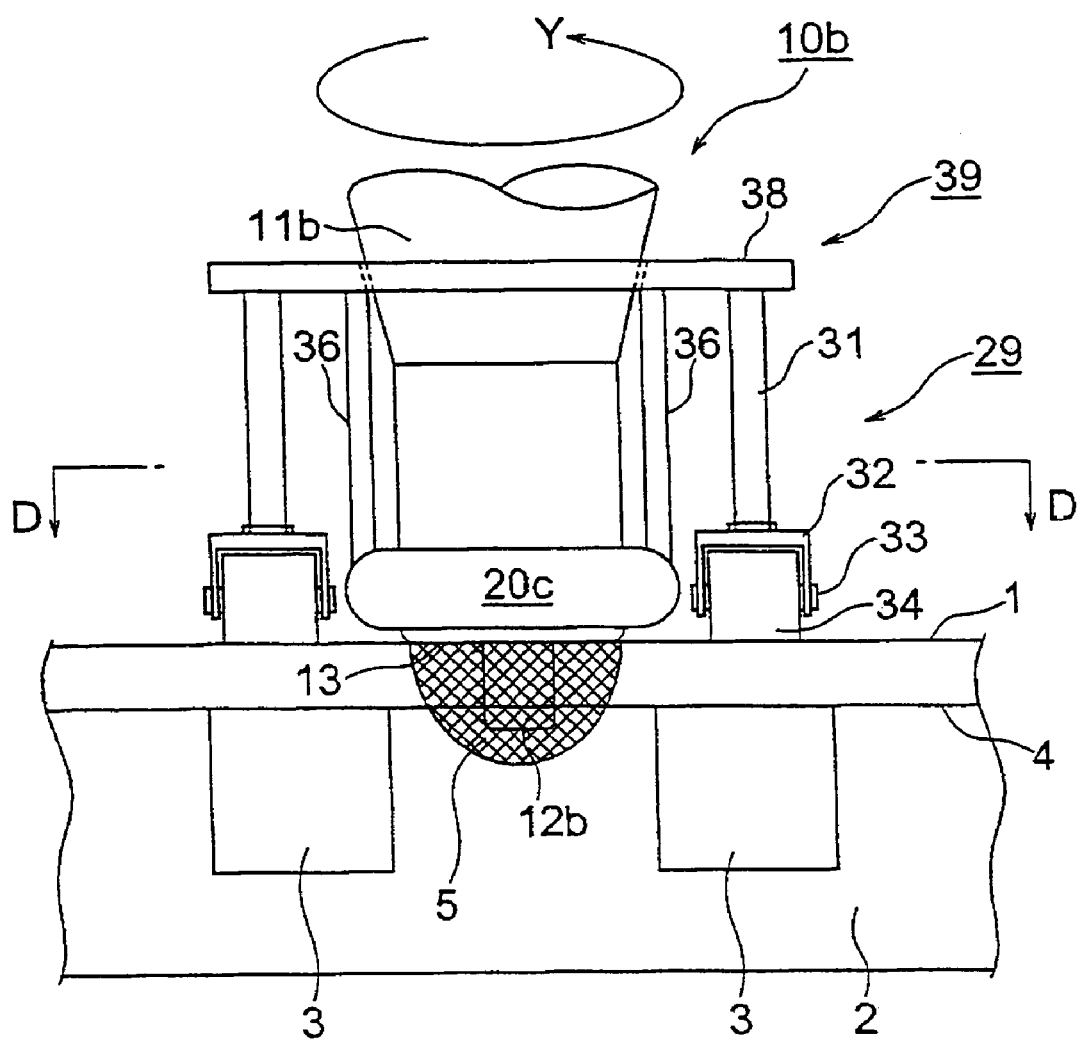
FIG. 7 is a cross sectional front view showing a state in which a FSW tool of a third embodiment according to the present invention performs a welding work.
Figure 8:
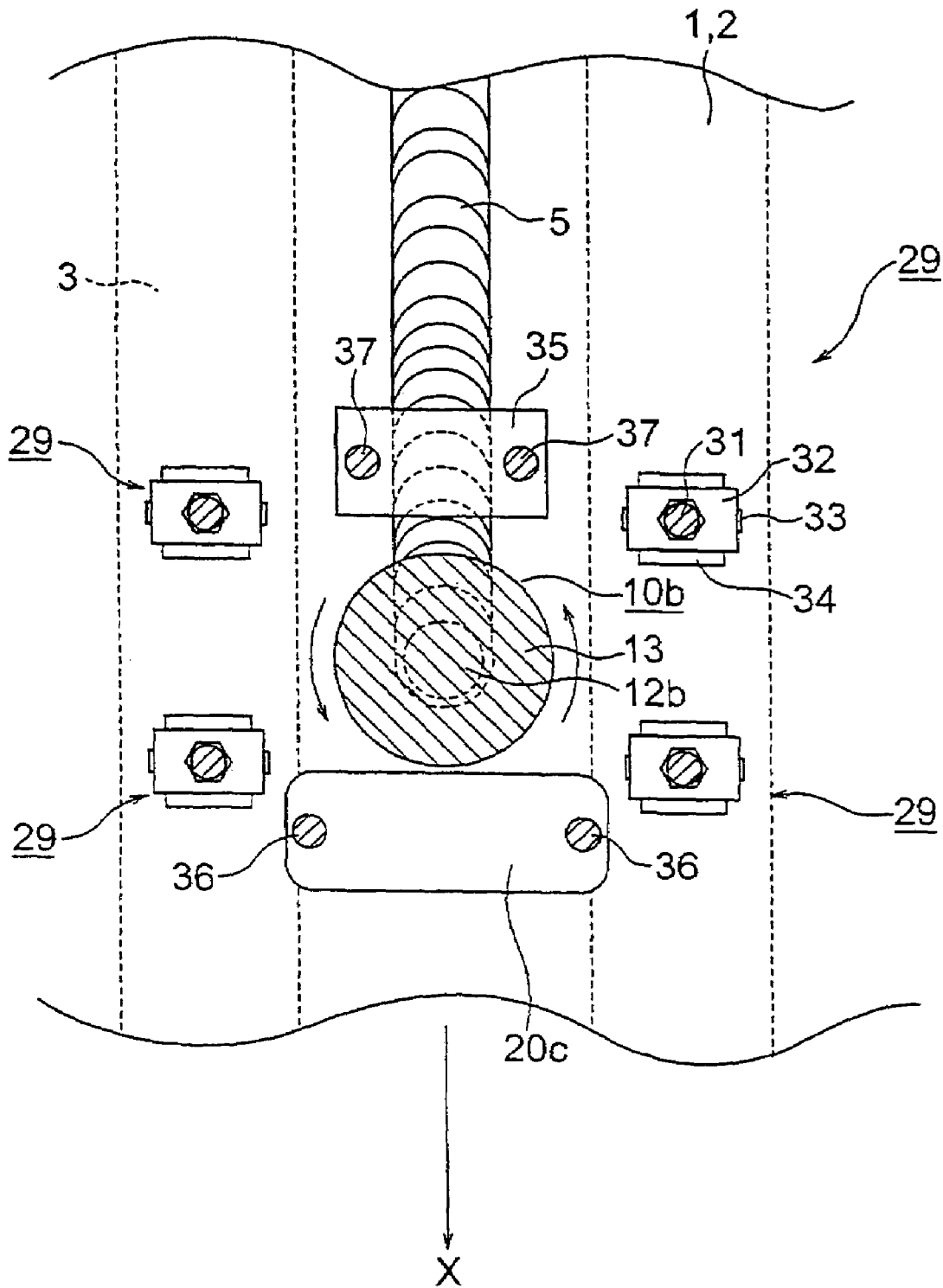
FIG. 8 is a cross sectional view taken on line D—D of FIG. 7.

In FIGS. 7 and 8, a plurality of rollers 34 are arranged around, and at an appropriate distance away from, the FSW tool 10*b*. Each of the rollers 34 is rotatably fitted to a pin 33 that has both its ends fixed to a holder 32.

Also, a revolving stand 38 is revolvably fitted to a moving and supporting stand (not shown). A plurality of struts 31 is fitted to a lower surface of the revolving stand 38 so as to slidably move up and down via cylinders or compression springs. The holder 32 is fixed to a lower (distal) end of each of the struts 31. Thus, a pressing device 29 is constructed by the rollers 34, holders 32, struts 31 and revolving stand 38. The rollers 34 constantly press down on the upper plate 1 with a predetermined pressing force so that the upper plate 1 makes close contact with the lower plate 2.

Further, a heater 20*c* for heating the weld portion of the upper and lower plates 1, 2 is arranged at a close front position of the FSW tool 10*b* in the moving direction X. This heater 20*c* also is fitted to the revolving stand 38 via support legs 36.

The heater 20*c* makes no contact with the upper plate 1 nor with the shoulder portion 13 and is appropriately selected, for example, from an induction heating device or the like. Nevertheless, it may also be selected from a heater or the like that makes contact with the upper plate 1 with an appropriate pressing force.

Also, an inspecting device 35 for inspecting the work quality of the weld portion 5 welded by FSW is arranged at a rear position of the FSW tool 10*b*. This inspecting device 35 also is fitted to the revolving stand 38.

The inspecting device 35 may be either of a contact type or a non-contact type and is selected from devices constructed such that signals of an image of a weld portion 5 surface taken by a CCD camera arranged noncontact-wise are inputted into a control section (not shown), or such that signals of an internal welded state taken by an ultrasonic or X-ray inspecting device provided making contact with the weld portion 5 are inputted into a control section (not shown).

The control section analyzes these signals and judges whether the welded state of the weld portion 5 is sufficient or not with respect to the heating state and the revolution and moving speed of the FSW tool 10*b*. This allows the operation conditions of the heating temperature of the weld portion 5 and the pressure, revolution and moving speed of the FSW tool 10*b*, etc. to be controlled at an optimal state.

By the construction of the heater 20*c*, inspecting device 35 and pressing device 29 being fitted to the revolving stand 38, when the FSW tool 10*b* makes linear or winding movements along the weld portion 5, these devices can move together with the FSW tool 10*b*.

According to the FSW carried out by the FSW tool 10*b*, heater 20*c* and pressing device 29 of the above-described third embodiment, no large load acts on the probe 12 and shoulder portion 13 and their sizes can be reduced. If an integrated piping plate is to be manufactured, the integration degree can be enhanced and, at the same time, the work speed can be enhanced, thereby contributing to reducing the time required to perform the welding.

Also, by providing the inspecting device, the welding quality can be inspected at the same time. Thereby, a work failure can be instantly corrected so that the amount of defects can be reduced and the yield of the products can be remarkably enhanced.

Moreover, due to the plurality of pressing device 29, the portion near the probe 12 of the upper plate 1 is pressed down with an appropriate pressing force. Thereby, the upper plate 1 makes close contact with the lower plate 2, and separation of the upper plate 1 from the lower plate 2 due to vibrations caused by stirring by the probe 12 can be prevented so that the welding is ensured.

In the above, while the present invention has been described with respect to the first, second and third embodiments, the present invention is by no means limited thereto, but may be supplemented with various modifications and variations of the concrete structure within the scope of claims of the invention as appended hereto.

What is claimed is:

1. A friction stir welding (FSW) apparatus for effecting FSW of metal members lapped one on another, comprising:
a FSW tool having a probe and a rotator, said probe and said rotator both being made of a non-conductive material;
an electromagnetic induction heater provided in the vicinity of, and concentrically with, said FSW tool, said electromagnetic induction heater having a structure and being arranged such that when a portion of the metal members is being stirred by said probe, heat from said electromagnetic induction heater is directed towards the portion of the metal members being stirred by said probe; and
an electromagnetic wave shield positioned above said electromagnetic induction heater at a side of said electromagnetic induction heater that is facing away from said probe.

2. The FSW apparatus of claim 1, further comprising:
a temperature sensor provided in the vicinity of said FSW tool;
a temperature setting unit for setting a predetermined temperature;
a comparing unit for computing a temperature difference between a temperature measured by said temperature sensor and a temperature set by said temperature setting unit; and
a control unit for controlling a supply current or a supply power to be supplied to said electromagnetic induction heater based on the temperature difference computed by said comparing unit.

3. The FSW apparatus of claim 1, further comprising:
a probe rotational state measuring device for measuring a rotational state of said probe; and
a control unit for adjusting a supply current or a supply power to be supplied to said electromagnetic induction heater corresponding to the size of a value measured by said probe rotational state measuring device.

4. A friction stir welding (FSW) method comprising:
lapping metal members one on another;
inserting a rotating probe of a FSW tool into a contact portion of said metal members so that said contact portion is softened by frictional heat and stirred by said probe such that said metal members become welded together, said FSW tool having a rotator, said rotating probe and said rotator being made of a non-conductive material;
heating a portion of said metal members while the portion of said metal members is being stirred by said probe, the portion of said metal members being heated by an electromagnetic induction heater positioned concentrically around said FSW tool; and
protecting metal components other than said metal members from electromagnetic waves with an electromagnetic wave shield positioned above said electromagnetic induction heater at a side of said electromagnetic induction heater that is facing away from said probe.

5. The FSW method of claim 4, further comprising:
measuring a heating temperature of said metal members with a temperature sensor in the vicinity of said FSW tool; and
controlling an output of said electromagnetic induction heater based on a value of said heating temperature measured by said temperature sensor.

6. The FSW method of claim 5, further comprising:
adjusting the distance between said electromagnetic induction heater and a surface of said metal members.

7. The FSW method of claim 4, further comprising:
measuring a rotational state of said probe; and
controlling an output of said electromagnetic induction heater based on said rotational state.

8. The FSW method of claim 4, further comprising:
adjusting the distance between said electromagnetic induction heater and a surface of said metal members.

9. A friction stir welding (FSW) method comprising the steps of:
lapping metal members one on another;
inserting a rotating probe of a FSW tool into a contact portion of said metal members and moving said probe forward in a moving direction so that said contact portion is softened by frictional heat and stirred by said probe such that said metal members become welded together;
heating a portion of said metal members surrounding said probe by a heater, said heater being positioned forward of said probe with respect to the moving direction of said probe; and
inspecting an internal portion of said metal members welded by FSW with an inspection device, said inspection device being positioned rearward of said probe with respect to the moving direction of said probe, wherein said inspection device is selected from the group consisting of ultrasonic inspecting devices and x-ray inspecting devices.

10. The FSW method of claim 9, further comprising:
pressing a portion of said metal members surrounding said FSW tool.

11. The FSW method of claim 9, further comprising:
revolving said heater via a revolving stand while moving said heater in the moving direction of said probe.

* * * * *